United States Patent
Gauderis et al.

(10) Patent No.: US 12,282,709 B2
(45) Date of Patent: *Apr. 22, 2025

(54) CAD MODEL COMPRESSION VIA AUTOMATED BLOCK GENERATION

(71) Applicant: BRICSYS NV, Ghent (BE)

(72) Inventors: Tjerk Gauderis, Ghent (BE); Geert Machtelinck, Merelbeke (BE); Wouter Nys, Kortrijk (BE)

(73) Assignee: BRICSYS NV, Ghent (BE)

( * ) Notice: Subject to any disclaimer, the term of this patent is extended or adjusted under 35 U.S.C. 154(b) by 858 days.

This patent is subject to a terminal disclaimer.

(21) Appl. No.: 17/263,495

(22) PCT Filed: Aug. 21, 2019

(86) PCT No.: PCT/EP2019/072412
§ 371 (c)(1),
(2) Date: Jan. 26, 2021

(87) PCT Pub. No.: WO2020/057885
PCT Pub. Date: Mar. 26, 2020

(65) Prior Publication Data
US 2021/0240882 A1    Aug. 5, 2021

(30) Foreign Application Priority Data

Sep. 17, 2018 (EP) .................................. 18194899

(51) Int. Cl.
*G06F 30/10* (2020.01)
*G06F 111/20* (2020.01)

(52) U.S. Cl.
CPC .......... *G06F 30/10* (2020.01); *G06F 2111/20* (2020.01)

(58) Field of Classification Search
CPC ...... G06F 30/10; G06F 30/13; G06F 2111/20; G06F 30/17; G06F 30/12
See application file for complete search history.

(56) References Cited

U.S. PATENT DOCUMENTS 11,328,100 B2 * 5/2022 Milovanov ............. G06F 30/10
2004/0249809 A1 * 12/2004 Ramani ............... G06F 16/5854
(Continued)

FOREIGN PATENT DOCUMENTS

| CA | 2758363 A1 * | 5/2013 | ............. G06F 17/50 |
| EP | 2808810 B1 | 12/2014 | |
| WO | WO-2008094170 A1 * | 8/2008 | ............. G06F 30/00 |

OTHER PUBLICATIONS

Sakurai, Hiroshi, and David C. Gossard. "Recognizing shape features in solid models." IEEE Computer Graphics and Applications 10.5 (1990): 22-32. (Year: 1990).*

(Continued)

*Primary Examiner* — David A Hopkins
(74) *Attorney, Agent, or Firm* — Maschoff Brennan

(57) ABSTRACT

A CAD model comprises multiple entities. Each entity comprises one or more subentities, wherein a subentity is a vertex, an edge or a face. From the CAD model a group of multiple entities comprising an identical geometry is obtained. This step comprises verifying whether the entities of a pair of entities comprise an identical geometry via sequentially verifying identity conditions of a sequence of multiple identity conditions, until either an identity condition of the sequence fails or all identity conditions of the sequence are verified. Each identity condition is based on the subentities of the pair of entities. A block definition comprising a block geometry based on said identical geometry is created. In the CAD model, the entities of the group are (Continued)

replaced with block references comprising a pointer to the block definition. The CAD model is thereby compressed.

14 Claims, 3 Drawing Sheets

(56) References Cited

U.S. PATENT DOCUMENTS

| | | | | |
|---|---|---|---|---|
| 2007/0120714 A1* | 5/2007 | Beltran | ............... | G06F 30/00 341/106 |
| 2008/0079729 A1* | 4/2008 | Brailovsky | .......... | G06V 10/757 345/619 |
| 2008/0188969 A1* | 8/2008 | O'Malley | ............... | G06T 17/00 700/97 |
| 2010/0135535 A1* | 6/2010 | Gutierrez | ............... | G06T 19/00 345/420 |
| 2014/0184594 A1* | 7/2014 | Janvier | ................ | G06T 17/005 345/420 |
| 2014/0354636 A1 | 12/2014 | Rorato | | |
| 2018/0181682 A1 | 6/2018 | Rorato | | |

OTHER PUBLICATIONS

CAD Project Point (hereinafter CPP), YouTube Video: "Batch Find And Replace Objects in AutoCAD with dwgExplore", Aug. 29, 2016, URL: www(dot)youtube(dot)com/watch?v=iYjUU1knh3l (Year: 2016).*

Huang, Liang-Kai, and Mao-Jiun J. Wang. "Efficient shape matching through model-based shape recognition." Pattern Recognition 29.2 (1996): 207-215. (Year: 1996).*

AutoCAD, "Create Blocks Within a Drawing", AutoCAD 2011 Help, URL: docs(dot)autodesk(dot)com/ACD/2011/ENU/filesAUG/WS1a9193826455f5ffa23ce210c4a30acaf-6e94.htm, accessed via the Wayback machine, archive date Mar. 12, 2011 (Year: 2011).*

AutoCAD, "Beginner's Guide for CAD Terms—Part Two", Blog Posting Jul. 2021, URL: www(dot)autodesk(dot)com/blogs/autocad/beginners-guide-for-cad-terms-part-two/—see the definitions for "Block" and "Block Definition" (Year: 2021).*

CAD Project Point, Product page for "Find and Replace Objects in AutoCAD with dwgExplore", URL: www.cpprs.com/dwgexplore.html, accessed via the WayBack machine, archive date Feb. 26, 2018, see # 1-3 (Year: 2018).*

J. Sutphin, AutoCAD 2004 VBA: A Programmer's Reference, Chapter 13—see pp. 347-352 (Year: 2004).*

QCAD Glossary, Accessed on Nov. 30, 2023, URL: qcad(dot)org/de/78-qcad/78-qcad-glossary (Year: 2023).*

CAD Project Point, YouTube Video: "Find and Replace Objects in AutoCAD with dwgExplore", Jul. 31, 2015, URL:www(dot)youtube(dot)com/watch?v=JiHIRvbGYOU—see the video description and see the video including the 0-15 minute time (Year: 2015).*

McWherter, David, et al. "Solid model databases: Techniques and empirical results." J. Comput. Inf. Sci. Eng. 1.4 (2001): 300-310 (Year: 2001).*

Lim, H. S., and S. Hossein Cheraghi. "An optimization approach to shape matching and recognition." Computers & electrical engineering 24.3-4 (1998): 183-200. See the abstract and § 2.2.2 (Year: 1998).*

Li, Haiyan, et al. "Hint-based generic shape feature recognition from three-dimensional B-rep models." Advances in Mechanical Engineering 7.4 (2015): 1687814015582082. See the abstract and pp. 1-2, 5-9 (Year: 2015).*

Koloros, Martin, and Jiri Žára. "Coding of vectorized cartoon video data." Proceedings of the 22nd Spring Conference on Computer Graphics. 2006. See the abstract and § 5.2 (Year: 2006).*

Funkhouser, Thomas, and Philip Shilane. "Partial matching of 3 d shapes with priority-driven search." ACM International conference proceeding series. vol. 256. 2006. See the abstract, §§ 1, 3, 3.3-3.4 (Year: 2006).*

AutoCAD Tips, "Turn Shape Objects into Blocks", Apr. 2012, URL: autocadtips1(dot)com/2012/04/12/turn-shape-objects-into-blocks (Year: 2012).*

Edwin Prakoso, "Why you should use AutoCAD blocks", Blog Posting, Jan(dot) 4th, 2013, URL: www(dot)cad-notes(dot)com/why-use-autocad-blocks/—see pp. 1-2 (Year: 2013).*

Cardone, Gupta and Karnik, "A Survey of Shape Similarity Assessment Algorithms for Product Design and Manufacturing Applications", Journal of Computing and Information Science in Engineering, vol. 3, Issue 2, pp. 109-118 (Jun. 2003), doi : 10.1115/1.1577356.

Dinesh Shikhare et al, "Compression of Large 3D Engineering Models using Automatic Discovery of Repeating Geometric Features", Computer Methods in Applied Mechanics and Engineering,Nov. 23, 2001 (Nov. 23, 2001), p. 233-240.

"AutoCAD 2013 for Dummies", John Wiley & Sons (2012), ISBN 978-1-118-39217-1, pp. 369-386.

* cited by examiner

CAD MODEL COMPRESSION VIA AUTOMATED BLOCK GENERATION

TECHNICAL FIELD

The invention pertains to the technical field of computer-aided design (CAD). The invention may in particular pertain to compressing a CAD model.

BACKGROUND

EP 2 808 810 B1 discloses a computer-implemented method for compressing a 3D modeled object. A boundary representation of the modeled object is provided. First data is determined, that describe a mapping from the range of a reference function to the range of another function. Second data is determined, which describe a mapping from the domain of the other function to the domain of the reference function which, when composed with the reference function and the mapping from the range of the reference function to the range of the other function, leads to the same result as applying the other function. In the geometrical data, the other function is replaced by the first data, the second data and a pointer to the reference function. Such a method improves the compression of a 3D modeled object.

EP 2 808 810 B1 involves a CAD model defined in terms of low-level features (boundary representation), mathematical operations performed on the low-level features, and data replacement in the CAD model based on the mathematical operations for compression of the CAD model.

In computer-aided design (CAD), a user may create a block definition, see e.g. the BLOCK command in BricsCAD V18 and AutoCAD 2018. The block definition comprises a block geometry. To insert one or more instances of the block geometry in a CAD model, the user may insert one or more block references in the CAD model. A block reference comprises a pointer to the block definition and a position within the CAD model. The block reference may further comprise transformation data, such as rotation and/or scaling data.

Chapter 17 of "AutoCAD 2013 for Dummies", John Wiley & Sons (2012), ISBN 978-1-118-39217-1, pages 369-386, is entitled "The ABCs of Blocks". In this chapter, the terms "block", "block definition" and "block reference" are explained and utilized throughout.

This methodology provides a well-known way to represent multiple instances of a block geometry in a CAD model. By storing only one block definition and creating for each instance a block reference in the CAD model, required computer resources (disk, memory and CPU time) can be reduced to a fraction.

In highly collaborative environments, CAD files with duplicated geometries are often encountered. This may result from user inexperience, file format incompatibility, and the like. It may occur that required computer resources (mainly memory and/or CPU time) to handle CAD files with duplicated geometries are unacceptably close to or exceed available computer resources on certain computer systems. A user may create a block definition based on the geometry, and may replace the duplicated geometries in the CAD model with block references. This is disadvantageous due to the possibility of an incomplete user detection of all duplicates, the required user effort, and the like.

A CAD model often leads to an embodiment in the real world. For example, a mechanical CAD assembly comprising multiple components, may initially be used to detect component interferences and simulate component interactions, and may later be used for machining the designed components. In an industrial environment, it is important to know which components are duplicates, as they may be realized by the same machining sequence and the same configuration of corresponding machining devices. This is not only important to avoid duplicate work, but also for (e.g. automated) production facility layout, where machining device work load and machining device reconfiguration have to be taken into account.

There hence is a need in the art for an automated block generation for duplicated geometries in CAD.

Cardone, Gupta and Karnik, "A Survey of Shape Similarity Assessment Algorithms for Product Design and Manufacturing Applications", Journal of Computing and Information Science in Engineering, Volume 3, Issue 2, pages 109-118 (June 2003), doi: 10.1115/1.1577356, teaches shape similarity assessment in CAD models via abstracting 3D object shapes into shape signatures and using the shape signatures to perform similarity assessment. The shape signature should be invariant with respect to the underlying representation and with respect to transformations (translations, rotations). Feature-based techniques evaluate the shape signature of an object based on the type, size, orientation, number and other properties of features and their interactions.

Cardone (2003) discloses a distance measure based on shape signatures to quantify shape similarity, and therefore remains silent on efficient detection of shape inequality. Cardone (2003) remains silent on CAD blocks, and hence also on block definitions and block references.

EP 2 808 810 B1 remains silent on CAD blocks, and hence also on block definitions and block references.

The present invention aims to resolve at least some of the problems mentioned above.

SUMMARY OF THE INVENTION

In a first aspect, the present invention provides a computer-implemented method (CIM) for automated generation of a block definition for a computer-aided design (CAD) model.

In a second aspect, the present invention provides a computer system for automated generation of a block definition for a CAD model, whereby the computer system is configured for performing the CIM according to the first aspect of the present invention.

In a third aspect, the present invention provides a computer program product (CPP) for automated generation of a block definition for a CAD model, whereby the CPP comprises instructions for performing the CIM according to the first aspect of the present invention. The CPP comprises in particular instructions which, when the CPP is executed by a computer, cause the computer to carry out the CIM according to the first aspect of the present invention.

The present invention realizes compression of the CAD model.

The present invention enables efficient detection of non-identical geometries. One of ordinary skill in the art will appreciate that identical geometries may be equal in size or may be proportional. In the latter case, a global scaling factor relates the dimensions of the entities. The present invention realizes this efficient detection via a sequence of identity conditions which all have to be fulfilled in order for two entities to comprise identical geometries. The identity conditions may be selected and ordered based on required computer resources (such as CPU time, memory and disk bandwidth occupancy) for their verification and the likelihood of failure in case of non-identical geometries.

Efficient detection of non-identical geometries is an important consideration for large CAD models. Such CAD models cannot be loaded in full in LI cache, or can sometimes not even be loaded in full in random access memory (RAM). CAD models are also used for collaborations, often for joint development over distributed computer networks. Pairwise comparisons of entities require large amounts of data transfer (between cache levels, from disk to RAM, between computers in a distributed network) when geometries are mapped in full. The present invention aims to circumvent loading of full geometries. The present invention aims to circumvent pairwise geometry mappings. This is achieved via sequential comparison of small sets of properties. Instead of attempting to map a geometry of an entity onto a geometry of another entity, a sequence of multiple comparison conditions is assessed until either a condition fails or all conditions are verified with success. As in many practical applications a large amount of different entities are present in a CAD model, this avoids the expensive full loading and mapping of geometries for each pair of entities.

Further advantages are described below.

DETAILED DESCRIPTION OF THE INVENTION

Figure 1:
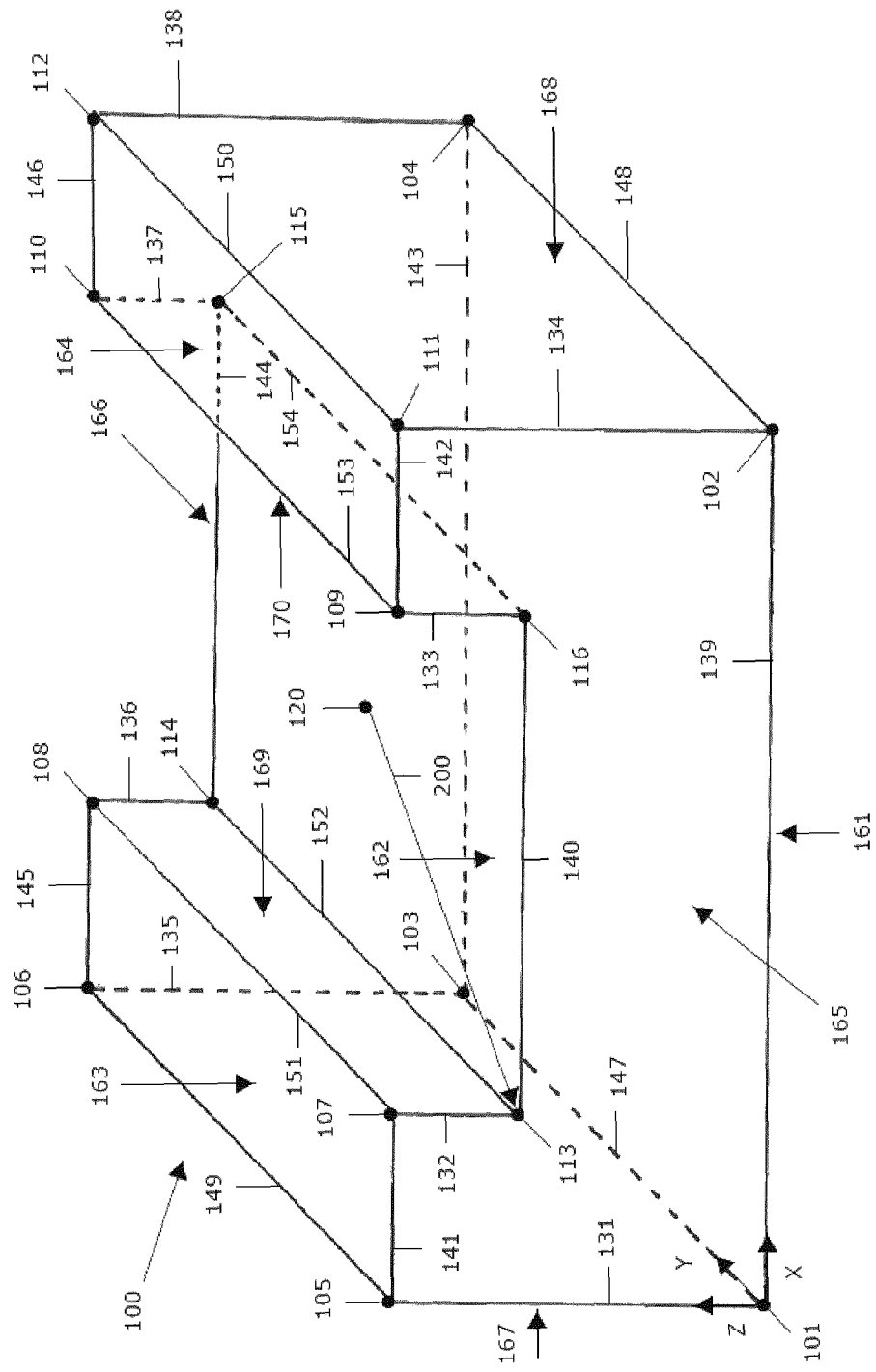
FIG. 1 shows a schematic perspective representation of an exemplary CAD model comprising a solid (100) comprising boundary elements.

The present invention concerns a computer-implemented method (CIM), a computer system, and a computer program product (CPP) for block generation in a computer-aided design (CAD) model. The invention has been summarized in the corresponding section above. In what follows, the invention will be described in detail, preferred embodiments are discussed, and the invention will be illustrated by means of non-limitative examples.

Unless otherwise defined, all terms used in disclosing the invention, including technical and scientific terms, have the meaning as commonly understood by one
of ordinary skill in the art to which this invention belongs. By means of further guidance, term definitions are included to better appreciate the teaching of the present invention.

Term Definitions

"A", "an", and "the" as used herein refer to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specify the presence of what follows (e.g. component) and do not exclude or preclude the presence of additional, non-recited components, features, elements, members, and steps.

"Based on" as used herein is synonymous with "based at least in part on" and is an inclusive or open-ended term that specifies the presence of what follows (e.g. component) and does not exclude or preclude the presence of additional, non-recited components, features, elements, members, and steps.

A "computer-aided design model" (CAD model), as used herein, comprises computer-processable data, preferably digital data, about one or more entities. The data represents, or allows to derive, one or more properties of an entity, such as geometric properties, material properties and/or semantic properties. In case the CAD model comprises computer-processable data about multiple entities, the data also represents, or allows to derive, relative geometric properties between entities. The present invention may pertain to various types of CAD models, such as, for example, a building information model (BIM), a computer-aided architectural design (CAAD) model, or a mechanical engineering CAD model. An exemplary file format for storing a CAD model is DWG. A CAD model comprises a computer-processable image in vector format, e.g. in DWG file format, defined in terms of low-level features, such as, for example, vertices, edges, and faces.

An "entity", as used herein, is a computer-processable representation, preferably a digital representation, of a modelled element, e.g. a building element or a mechanical component. An entity may be a solid, a surface or a curve. A non-limiting list of examples of representation schemes for entities comprises boundary
representation, cell decomposition, constructive solid geometry, function representation, indirect history-based modelling, parametrized primitive instancing, spatial occupancy enumeration, surface mesh modeling and sweeping. An "entity", as used herein, comprises one or more subentities, wherein a subentity is a vertex, an edge or a face. A solid may comprise vertices, edges and faces. A surface may comprise vertices, edges and faces. A curve (such as a line, an arc, a circle or a spline) may comprise vertices (such endpoints, midpoints, knots or center points) and edges (such as straight or curved line segments). An entity is preferably a solid.

An entity, as used herein, preferably comprises a "boundary representation" (BREP or B-rep). A BREP represents an entity using the boundary. A BREP comprises one or more boundary elements. A boundary element is a vertex, an edge or a face. In this case, a subentity of the entity is a boundary element. A solid, for example, may be represented as a collection of connected surface elements, which is the boundary between solid and non-solid. A BREP, as used herein, is not limited to straight edges and planar faces. A face of a BREP may, for example, be based on a quadric surface or a non-uniform rational basis spline (NURBS). The Standard for the Exchange of Product Model data defines some exemplary data models for BREP, see e.g. ISO 10303-42, ISO 10303-508, ISO 10303-509, ISO 10303-511, ISO 10303-512, ISO 10303-513, ISO 10303-514 and ISO 10303-521.

A "geometry" of an entity relates to the subentities, the geometric properties of the subentities, and the relative geometric properties between the subentities. Entities comprise an "identical geometry" in case the subentities, geometric properties and relative geometric properties are either equal or proportional based on a global scaling factor. One of ordinary skill in the art will appreciate that said proportionality based on a global scaling factor has different implications for different properties:

presence properties (e.g. number of vertices) should be equal;

linear size properties (e.g. length) should be proportional to the scaling factor;

quadratic size properties (e.g. area) should be proportional to the square of the scaling factor;

cubic size properties (e.g. volume) should be proportional to the cube of the scaling factor; and relative size properties (e.g. ratio of a first linear size property and a second linear size property) should be equal.

A CAD model may be viewed and edited via a corresponding CPP, so-called CAD software. CAD software may provide a graphical user interface (GUI) for viewing and editing the CAD model. A non-limiting list of examples of CAD software comprises 123D, ACIS, Advance Concrete, Advance Design, Advance Steel, AllyCAD, ArchiCAD, AutoCAD, BricsCAD, BRL-CAD, C3D, Caddie, Cadwork, CATIA, Chief Architect, Cobalt, Creo, DataCAD, DesignSpark Mechanical, Digital Project, Drawing Express, FINE MEP, form•Z, FreeCAD, HiCAD, IDEA Architectural, Inventor, IRONCAD, ItelliCAD, KeyCreator, LibreCAD, MEDUSA, MicroStation, Modelur, NanoCAD, NX, OpenCASCADE, OpenSCAD, Parasolid, PTC Creo, PowerCADD, progeCAD, PunchCAD, QCad, Revit Architecture, Revit MEP, Revit Structure, Rhinoceros 3D, RoutCad, SALOME, ShapeManager, SketchUp, Solid Edge, SolidWorks, SolveSpace, SpaceClaim, SpaceClaim Engineer, Tekla Structures, TopSolid, TransMagic, TurboCAD, VariCAD, VectorWorks, and VisualARQ.

A non-limiting list of examples of "geometric properties" of an entity comprises a dimension, such as a length, a width, a height, a thickness, a diameter, and the like; a dimensionality of an opening, recess or protrusion; a direction of a principal axis; a largest edge length; a largest face area; a layer thickness; a maximal dimension; a measure of concavity; a measure of convexity; a number of conical faces; a number of cylindrical faces; a number of edges; a number of faces; a number of horizontal faces; a number of layers; a number of openings; a number of planar faces; a number of protrusions; a number of recesses; a number of toroidal faces; a number of vertical faces; a number of vertices; a position; a presence of a component; a presence of an extrusion direction; a radius of curvature; a ratio of a largest edge length to another edge length; a ratio of a largest face area and another face area; a ratio of a volume of the solid and a volume of a bounding box of the solid; a ratio of two maximal dimensions in mutually orthogonal directions; a relative area; a relative dimension; a relative size of the solid with respect to a size of the CAD model; a relative vertical location of the solid with respect to a total height of the CAD model; a relative volume; a shape; a spline parameter; a volume; an area; an inclination of a largest edge with respect to a reference direction, such as a Z-direction; an inclination of a largest face with respect to a reference direction, such as a Z-direction; an inclination to a reference direction, such as a Z-direction, of a line fitted through a horizontal face of a solid; an inclination, such as with the Z-direction (vertical axis); an orientation; in case of presence of an extrusion direction, a shape of an extrusion profile; and three maximal dimensions in mutually orthogonal directions, such as a height, a length and a width.

A "relative geometric property" may relate to two or more entities, such as two, three, four, five, six, seven or more entities. A relative geometric property preferably relates to a pair of entities, i.e. two entities. A non-limiting list of examples of relative geometric properties of multiple entities comprises a number of sideways connecting entities; a number of touching entities; a position of a contact area; a relative angle, such as a relative angle between faces or axes; a relative distance; a relative orientation; a relative position, such as a relative height; a relative size of a contact area; a relative size, such as a relative dimension, relative area, or relative volume; and a size of a contact area.

Aspects of the Present Invention

In a first aspect, the present invention provides a computer-implemented method (CIM) for automated generation of a block definition for a computer-aided design (CAD) model, comprising several steps. In a second aspect, the present invention provides a computer system for automated generation of a block definition for a CAD model, whereby the computer system is configured for performing the CIM according to the first aspect. In a third aspect, the present invention provides a computer program product (CPP) for automated generation of a block definition for a CAD model, whereby the CPP comprises instructions for performing the CIM according to the first aspect. The CPP in particular comprises instructions which, when the CPP is executed by a computer, such as a computer system according to the second aspect, cause the computer to carry out the CIM according to the first aspect. The third aspect may further also relate to a tangible non-transitory computer-readable data carrier comprising said CPP. The three aspects of the present invention are hence interrelated. Therefore, all features disclosed in this document, above or below, may relate to each of these aspects, even if they have been disclosed in conjunction with a particular aspect.

The CAD model comprises multiple entities. Each entity comprises one or more subentities, wherein a subentity is a vertex, an edge or a face. From the CAD model a group of multiple entities comprising an identical geometry is obtained. This step comprises verifying whether the entities of a pair of entities comprise an identical geometry via sequentially verifying identity conditions of a sequence of multiple identity conditions until either an identity condition of the sequence fails or all identity conditions of the sequence are verified. Each identity condition is based on the subentities of the pair of entities. A block definition comprising a block geometry based on said identical geometry is created. In the CAD model, the entities of the group are replaced with block references comprising a pointer to the block definition.

The present invention realizes compression of the CAD model. Working with a block definition and block references reduces required computer resources (such as CPU time, memory, and disk). This furthermore allows editing multiple geometrically identical parts of the CAD model simultaneously and with limited effort, via editing the block definition. A computer-implemented detection of duplicated geometries furthermore ensures a complete detection of all identical geometries. When entities, such as mechanical components, of the CAD model are realized, for example via machining, this ensures that production facility layout can be optimized and unnecessary production device reconfiguration can be avoided.

The present invention enables efficient detection of non-identical geometries. The efficient detection is realized via the sequence of identity conditions which all have to be fulfilled in order for two entities to comprise identical geometries. The sequence of multiple identity conditions is a sequence of necessary and sufficient conditions for verification that the entities of a pair comprise an identical geometry. The identity conditions may be selected and ordered based on required computer resources (such as CPU time, memory and disk bandwidth occupancy) for their verification and the likelihood of failure in case of non-identical geometries.

Efficient detection of non-identical geometries is an important consideration for large CAD models. Such CAD models cannot be loaded in full in LI cache, or can sometimes not even be loaded in full in random access memory (RAM). CAD models are also used for collaborations, often for joint development over distributed computer networks. Pairwise comparisons of entities require large amounts of data transfer (between cache levels, from disk to RAM, between computers in a distributed network) when geometries are mapped in full. The present invention aims to circumvent loading of full geometries. The present invention aims to circumvent pairwise geometry mappings. This is achieved via sequential comparison of small sets of properties. Instead of attempting to map a geometry of an entity onto a geometry of another entity, a sequence of multiple comparison conditions is assessed until either a condition fails or all conditions are verified with success. As in many practical applications a large amount of different entities are present in a CAD model, this avoids the expensive full loading and mapping of geometries for each pair of entities.

Each of the identity conditions is based on the subentities of the pair of entities. A subentity may be a vertex, an edge or a face. An identity condition may be based on a number of subentities of a certain type. An identity condition may be based on one or more geometrical properties of a subentity. An identity condition may be based on one or more relative geometrical properties of subentities of the same entity.

In a preferred embodiment, the sequence of identity conditions comprises one or more identity conditions based on an equality over the entities of the pair of entities of an amount of subentities, such as, for example, equality of the number of vertices, equality of the number of edges, equality of the number of faces, equality of the number of NURBS, and the like.

In a preferred embodiment, the sequence of identity conditions comprises one or more identity conditions based on an equality over the entities of the pair of entities of one or more geometrical properties of a subentity, such as, for example, equality of a length of an edge, equality of a radius of curvature of an arc, and the like.

In a preferred embodiment, the sequence of identity conditions comprises one or more identity conditions based on an equality over the entities of the pair of entities of one or more relative geometrical properties of subentities of an entity, such as, for example, a distance between two vertices of an entity, a relative angle between two edges of an entity, and the like.

A block reference may further comprise position data. A block reference may further comprise rotation data. A block reference may further comprise translation data. A block reference may further comprise a scaling factor with respect to the block geometry. A block definition and/or a block reference may further comprise additional information, such as dimensional or visualization information. A non-limiting list of examples of visualization information comprises a text, a color, a transparency, and a line width. A block definition may comprise a block geometry comprising a geometric property defined via a parameter, whereby a block reference comprising a pointer to the block definition comprises a numerical value for the parameter.

In a preferred embodiment, the block definition and the CAD model comprising the block references are stored on a tangible non-transitory computer-readable storage medium, such as, for example, a solid state disk or a cloud computing storage system. The computer system according to the second aspect may comprise the storage medium. The CAD model may or may not comprise the block definition. In the latter case, a separate file comprising another CAD model comprising the block definition may be stored on the storage medium. This is advantageous as the identification of a group, the creation of a block definition, and the replacement of entities of the group with block references has to be performed only once, and may be reused upon loading the stored CAD model and stored block definition from the storage medium. Several groups of multiple entities comprising an identical geometry may be handled sequentially. The CAD model and the block definition may be stored in between replacing in the CAD model the entities of a first group of multiple entities comprising a first identical geometry with block references and obtaining a second group of multiple entities comprising a second identical geometry.

In a preferred embodiment, an entity comprises a boundary representation (BREP). The BREP comprises one or more boundary elements. In this case, a subentity is a boundary element. In this case, an entity comprises a BREP comprising one or more boundary elements, wherein a boundary element is a vertex, an edge or a face.

This is advantageous as it enables efficient evaluation of the identity conditions. Each identity condition is based on the subentities of the pair of entities. In this embodiment, each identity condition is hence based on the boundary elements of the pair of entities. A BREP enables direct access to its boundary elements. This has to be contrasted with other representation schemes, such as, for example, constructive solid geometry (CSG) whereby an entity is represented by using Boolean operators combining simpler objects.

In a preferred embodiment, verifying whether the entities of a pair of entities comprise an identical geometry is performed without mapping the geometry of an entity of the pair of entities onto the geometry of another entity of the pair of entities. The verification whether geometries are identical may be performed based on features of the subentities, such as number of subentities of a particular type, relative distances between certain subentities, and the like.

In a preferred embodiment, the sequence of multiple identity conditions comprises at least three, preferably at least four, more preferably at least five, even more preferably at least six, and most preferably at least seven identity conditions.

This is advantageous as it enables a more efficient determination of non-identical geometries. More identity conditions, i.e. a determination of and split-up into a higher number of identity conditions of the required conditions for two entities to comprise an identical geometry, allow for a better sequence order based on required computer resources for their verification and the likelihood of failure in case of non-identical geometries.

In a preferred embodiment, an identity condition is based on equality of number of vertices.

In a preferred embodiment, an identity condition is based on equality of number of edges.

In a preferred embodiment, an identity condition is based on equality of number of faces.

In a preferred embodiment, an identity condition for a pair of entities comprising an equal number of vertices, the present identity condition preferably comprising a position in the sequence after said identity condition based on equality of number of vertices, is based on equality or proportionality of vertex distance lists. A vertex distance list of an entity comprises an ordered set of values. Each value of the vertex distance list is based on a distance of a vertex of the entity to a vertex centroid of the entity. Preferably, each value of the vertex distance list is the square of the distance of a vertex of the entity to a vertex centroid of the entity. Preferably, the ordered set of values is ordered based on increasing or decreasing magnitude of the values.

In a preferred embodiment, each entity of the pair of entities comprises N vertices: $P_i$ with $1 \leq i \leq N$. The CAD model comprises a global coordinate system. Each vertex $P_i$ comprises coordinates $(x_i, y_i, z_i)$ with respect to the global coordinate system. A vertex centroid $P_{vc}$ of the entity comprises coordinates $$(x_{VC}, y_{VC}, z_{VC}) = \frac{1}{N}\left(\sum_{i=1}^{N} x_i, \sum_{i=1}^{N} y_i, \sum_{i=1}^{N} z_i\right).$$

For each vertex $P_i$, the vertex distance list comprises a value equal to $di^2 = (x_i - x_{vc})^2 + (y_i - y_{vc})^2 + (z_i - z_{vc})^2$. The values of the vertex distance list are ordered in increasing or decreasing magnitude of the values. In case of equality or proportionality of the vertex distance lists, the identity condition is passed. Else, the identity condition is failed and further identity conditions in the sequence are not checked.

In a preferred embodiment, an identity condition for a pair of entities comprising an equal number of vertices and equal or proportional vertex distance lists, the present identity condition preferably comprising a position in the sequence after said identity condition based on equality of number of vertices and after said identity condition based on equality or proportionality of vertex distance lists, is based on equality of a total right-handedness (TRH). The TRH is a triple sum of the sign of the scalar triple product of a first, a second and a third vertex vector. A vertex vector of an entity is either a vector from the vertex centroid of the entity to a vertex of the entity or a vector from a vertex of the entity to the vertex centroid of the entity. The triple sum runs over all first vertex vectors comprising a common first norm, all second vertex vectors comprising a common second norm, and all third vertex vectors comprising a common third norm. The first, the second, and the third norm are different. The first, second and third norms for the entities of the pair of entities are furthermore pairwise related via said equality or proportionality of the vertex distance lists.

This is advantageous as it forms an efficient identity condition for checking that no local, partial or global reflections have occurred.

In a preferred embodiment, the TRH is a triple sum of the sign of the scalar triple product of a first vertex vector $\vec{v_{1,j}}$, a second vertex vector $\vec{v_{2,k}}$ and a third vertex vector $\vec{v_{3,l}}$:

$$TRH = \sum_{j=1}^{n_1} \sum_{k=1}^{n_2} \sum_{i=1}^{n_a} \mathrm{sign}\left[(\vec{v_{1,j}} \times \vec{v_{2,k}}) \cdot \vec{v_{3,l}}\right].$$

A vertex vector v[ of an entity is either a vector from the vertex centroid $P_{vc}$ of the entity to a vertex $P_i$ of the entity ($\vec{v_i} = (x_i - x_{vc}, y_i - y_{vc}, z_i - z_{vc})$) or a vector from a vertex P, of the entity to the vertex centroid $P_{vc}$ of the entity ($\vec{v_i} = (x_{vc} - x_i, y_{vc} - y_i, z_{vc} - z_i)$, preferably the former. The first sum runs over all $n_1$ first vertex vectors comprising a common first norm $\|\vec{v_{1,j}}\|$. The second sum runs over all $n_2$ second vertex vectors comprising a common second norm $\|\vec{v_{2,k}}\|$. The third sum runs over all $n_3$ third vertex vectors comprising a common third norm $\|\vec{v_{3,l}}\|$. Hereby, sign(x) is preferably equal to 1 if $x > 0$; 0 if $x = 0$; and $-1$ if $x < 0$.

In a preferred embodiment, each entity comprises M different squared distances in the vertex distance list with $N \geq M \geq 3$. As the vertex distance lists of the entities of the pair of entities are equal or proportional, M is equal for both entities. The identity condition may be based on equality of ordered total right-handedness lists. For each entity, an ordered vertex vector list may be obtained:

$$\left[(\vec{v_{1,1}}, \ldots, \vec{v_{1,n_1}}), \ldots, (\vec{v_{M,1}}, \ldots, \vec{v_{M,n_M}})\right] \text{ with } \sum_{p=1}^{M} n_p = N.$$

The vertex vectors of the ordered vertex vector list are ordered in increasing or decreasing magnitude of the norms of the vertex vectors, preferably thereby comprising a one-one correspondence with the vertex distance list comprising said ordered set of values. Hereby, all $n_p$ p-th vertex vectors $\vec{v_{p,i}}$ comprise a common p-th norm $\|\vec{v_{p,i}}\|$, with $1 \leq p \leq N$. An ordered total right-handedness list $[TRH(1,2,3), \ldots, TRH(M-2, M-1, M)]$ of M-2 total right-handedness values TRH(p, p+1, p+2) may be obtained, whereby:

$$TRH(p, p+1, p+2) = \sum_{j=1}^{n_p} \sum_{k=1}^{n_{p+1}} \sum_{i=1}^{n_{p+2}} \mathrm{sign}\left[(\vec{v_{p,j}} \times \vec{v_{p+1,k}}) \cdot \vec{v_{p+2,i}}\right].$$

In a preferred embodiment, an identity condition is based on equality or proportionality of edge parameters.

In a preferred embodiment, an identity condition is based on equality or proportionality of face parameters.

In a preferred embodiment, said sequence of identity conditions comprises at least seven identity conditions and said sequence of identity conditions comprises the following relative order for the following identity conditions:
  the identity condition based on equality of number of vertices;
  the identity condition based on equality of number of edges;
  the identity condition based on equality of number of faces;
  the identity condition based on equality or proportionality of vertex distance lists;
  the identity condition based on equality of the triple sum of the sign of the scalar triple product of a first, second and third vertex vector;
  the identity condition based on equality or proportionality of edge parameters; and
  the identity condition based on equality or proportionality of face parameters.

In a preferred embodiment, an input entity set comprising multiple input entities is obtained. For each input entity of the input entity set, a group of entities comprising a geometry identical to the geometry of the input entity is determined, which step comprises verifying whether the entities of a pair of entities comprise an identical geometry. Hence, the input entity and the entities of the group of entities associated with the input entity comprise an identical geometry. One or more candidate subsets are determined, each comprising an entity of a first group comprising a minimal cardinality over all groups of entities. The first group has then been treated. The other groups can then be treated iteratively. An untreated next group comprising a minimal cardinality over all untreated groups is selected. For the input entity associated with the next group and at least one input entity associated with at least one treated group at least one relative geometric property is determined. For each entity of the next group it is verified whether the entity and corresponding entities of a candidate entity subset comprise said at least one relative geometric property. One of ordinary skill in the art will appreciate that comprising said at least one relative geometric property implies equality or proportionality, as the case may be. Depending on the verification, the entity is added to the candidate entity subset or the candidate entity subset is discarded. This next group has then been treated, and a following group may be selected, comprising a minimal cardinality over all untreated groups. Once all groups are treated, zero, one or more candidate entity subsets may remain. The input entity subset and remaining candidate entity subsets comprise an identical set geometry, i.e. identical geometries for corresponding entities and identical relative geometric properties.

In a preferred embodiment, from the CAD model, multiple entity sets comprising an identical set geometry are obtained. A block definition comprising a block geometry based on said identical set geometry is created. In the CAD model, said entity sets are replaced with block references comprising a pointer to the block definition. A block reference may further comprise position data. A block reference may further comprise rotation data. A block reference may further comprise translation data. A block reference may further comprise a scaling factor with respect to the block geometry.

This is advantageous as it enables obtaining a group of entity sets comprising an identical set geometry and creating (1) a block definition based on the identical set geometry and (2) a block reference for each entity set of the group. For a group of entity sets comprising an identical set geometry, a single block definition is created. The entities of each entity set are replaced by a single block reference comprising a pointer to this block definition and further comprising a position. The block reference may further comprise transformation data. The block definition, the position, and (if present) the transformation data, allow to determine the entities of the replaced entity set, and their geometric properties and relative geometric properties. The determined entities according to the block reference comprise a position, an orientation and a size equal to the corresponding properties of the replaced entities of the original entity set.

The invention is further described by the following non-limiting examples which further illustrate the invention, and are not intended to, nor should they be interpreted to, limit the scope of the invention.

Example 1: Exemplary CAD Entity and Ordered Total Right-Handedness List

FIG. 1 shows a schematic perspective representation of an exemplary CAD model comprising a solid (100) comprising boundary elements. The boundary elements comprise:
16 vertices (101, 102, 103, 104, 105, 106, 107, 108, 109, 110, 111, 112, 113, 114, 115, 116);
24 straight edges (131, 132, 133, 134, 135, 136, 137, 138, 139, 140, 141, 142, 143, 144, 145, 146, 147, 148, 149, 150, 151, 152, 153, 154); and
10 planar faces (161, 162, 163, 164, 165, 166, 167, 168, 169, 170).

Faces (167), (168), (169) and (170) are perpendicular to the X-axis of the global coordinate system (GCS) of the CAD model. Faces (165) and (166) are perpendicular to the Y-axis of the GCS. Faces (161), (162), (163) and (164) are perpendicular to the Z-axis of the GCS. Table 1 lists exemplary coordinates for the vertices. The corresponding vertex centroid then comprises coordinates (7, 7, 4).

Table 1 also lists the vertex vectors from the vertex centroid to the vertices and the corresponding squared distances. The following vertex distance list corresponds with solid (100): [65, 65, 65, 65, 69, 69, 69, 69, 102, 102, 102, 102], comprising the squared distances in increasing magnitude. The following ordered TRH list corresponds with solid (100): [0, 0].

TABLE 1

Exemplary coordinates of the vertices of the solid (100) of FIG. 1

| | Coordinates | Vertex vector | Squared distances |
|---|---|---|---|
| Vertex (101) | (0, 0, 0) | (−7, −7, −4) | 114 |
| Vertex (102) | (14, 0, 0) | (7, −7, −4) | 114 |
| Vertex (103) | (0, 14, 0) | (−7, 7, −4) | 114 |
| Vertex (104) | (14, 14, 0) | (7, 7, −4) | 114 |
| Vertex (105) | (0, 0, 6) | (−7, −7, 2) | 102 |
| Vertex (106) | (0, 14, 6) | (−7, 7, 2) | 102 |
| Vertex (107) | (3, 0, 6) | (−4, −7, 2) | 69 |
| Vertex (108) | (3, 14, 6) | (−4, 7, 2) | 69 |
| Vertex (109) | (11, 0, 6) | (4, −7, 2) | 69 |
| Vertex (110) | (11, 14, 6) | (4, 7, 2) | 69 |
| Vertex (111) | (14, 0, 6) | (7, −7, 2) | 102 |
| Vertex (112) | (14, 14, 6) | (7, 7, 2) | 102 |
| Vertex (113) | (3, 0, 4) | (−4, −7, 0) | 65 |
| Vertex (114) | (3, 14, 4) | (−4, 7, 0) | 65 |
| Vertex (115) | (11, 14, 4) | (4, 7, 0) | 65 |
| Vertex (116) | (11, 0, 4) | (4, −7, 0) | 65 |

Example 2: Embodiment of an Algorithm According to the Present Invention

The present example provides an embodiment of an algorithm for automatic block generation for 3D solids.

The algorithm works for solids for which the geometry is stored as a boundary representation (BREP). This gives direct access to the faces, edges and vertices (and their coordinates and parameters) that constitute the boundary of the solid.

All solids in a full CAD drawing (CAD model) are scanned and divided in groups with identical geometry (i.e. possibly rotated and/or scaled). For each group with two or more solids, a block definition is created, the transformations of all solids are calculated, and the solids are replaced with a block reference to the created block definition.

This operation requires $O(q^2)$ equality checks between two solids, with q the number of solids in the CAD drawing. The present algorithm relies on a quick comparison routine which performs an equality check without having to do a full topological check on whether the two solid definitions are equal.

The quick comparison routine is multiple orders faster than a traditional solid comparison algorithm, since it does not attempt to map the structure and topology of one solid onto the other solid. Instead, it accesses the directly available numbers in the BREP, performs a limited number of simple operations on it (such as dot-products, squares and subtractions), stores the results in lists, which are then sorted and compared. The heaviest operation is each time the sorting operation, such that the full quick comparison routine is of the order of O(r log (r)), with r the number of edges. Full structure and topology mapping algorithms are typically at least $O(r^3)$.

The quick comparison routine concludes that two solids have an identical geometry (equal, or rotated and/or scaled) if it passes the following checks (identity conditions), which are ordered to maximize the "Fail As Soon As Possible" principle. This way, the least amount of time as possible is spent on a check between two solids that have different geometry. As soon as one of these tests fails, the quick comparison algorithm can return false.

1. Equal amount of vertices
2. Equal amount of edges
3. Equal amount of faces
4. Equal or proportional sorted lists of squared spherical distances of all vertices to the vertex centroid (vertex distance lists)
5. Equal lists of total right handedness
6. Equal or proportional edge parameters
7. Equal or proportional face parameters Equal or proportional sorted lists of squared spherical distances Suppose both solids have N vertices. Then, for each of the solids, the coordinates of their vertices can be written as $(x_i, y_i, z_i)$ for $i \in \{1, \ldots, N\}$. The coordinates of the vertex centroid can be defined as $$(x_{VC}, y_{VC}, z_{VC}) = \frac{1}{N}\left(\sum_{i=1}^{N} x_i, \sum_{i=1}^{N} y_i, \sum_{i=1}^{N} z_i\right).$$

Then, the squared spherical distance for each vertex is defined by $d_i^2 = (x_i - x_{vc})^2 + (y_i - y_{vc})^2 + (z_i - z_{vc})^2$. As such, two lists of length N with all squared spherical distances can be constructed, sorted from small to large, and checked against each other for equality, with possibly taking a constant global scaling factor into account for one of the lists.

This checks whether the vertices are similarly spread around the center. It can be proven that spherical distances remain invariant under rotation.

Equal Lists of Total Right-Handedness

For each of the two solids, each of the N vertices can have a (spherical) vertex vector assigned as follows: $\vec{v}_i = (x_i - x_{vc}, y_i - y_{vc}, z_i - z_{vc})$. Suppose there are M≤N different squared distances in the previously calculated list of squared spherical distances. From the previous check follows that M is equal for both solids. Then the list of vertex vectors $\vec{v}_i$ can be reorganized and renamed as the nested list:

$$\left[(\vec{v_{1,1}}, \ldots, \vec{v_{1,n_1}}), \ldots, (\vec{v_{M,1}}, \ldots, \vec{v_{M,n_M}})\right] \text{ with } \sum_{p=1}^{M} n_p = N.$$

From the previous check follows that all np will be the same for both solids. Now, for all p<M−2 the total right-handedness of p, p+1 and p+2 can be defined as:

$$TRH(p, p+1, p+2) = \sum_{j=1}^{n_1} \sum_{k=1}^{n_2} \sum_{l=1}^{n_a} RH\left(\vec{v_{p,j}}, \vec{v_{p+1,k}}, \vec{v_{p+2,l}}\right)$$

with $RH(\vec{v_1}, \vec{v_2}, \vec{v_3}) = \text{sign}[(\vec{v_1} \times \vec{v_2}) \cdot \vec{v_3}]$
with sign(d) equal to 1 if d>0; 0 if d=0; and −1 if d<0.

The check consists now in checking that for each of the two solids the following list is the same: [TRH(1,2,3), ..., TRH(M−2,M−1,M)]. This check makes sure that no local, partial or global reflections have happened.

Equal or Proportional Edge Parameters

A few definitions:
squared spherical distance of a point: squared distance to the vertex centroid, previously calculated
spherical orientation of a line taken in a point: absolute value of the dot-product of the normalized vector from the vertex centroid to that point and a normalized vector specifying the direction of that line (represents always an angle 0-90°)

For each of the solids, the edges in the BREP are looped and for each type of edges the following numbers are stored in a list (one list per type per solid):
linear edges:
squared distance start to end point
spherical orientation of the edge taken at the closest of start and end point
elliptical edges (including circular edges):
squared distance start to end point,
squared spherical distance of center point of the ellipse
squared distance center to mid-curve point
major to minor axis ratio
helical edges:
squared distance start to end point,
helix radius
handedness (boolean)
taper (angle)
spherical orientation of helix axis taken at the projection of the closest of start and end point to the helix axis
helix pitch
spline edges:
squared distance between start and end point
number of control points
squared spherical distances of the control points For each of the type of edges, these lists of (lists of) numbers are sorted lexicographically from lowest to highest and the list for each type is compared for the two solids. The values should all be equal (or proportional based on the global scaling factor) and guarantee identical edge models between the two solids.

Equal or Proportional Face Parameters

For each of the solids, the faces in the BREP are looped and for each type of faces the following numbers are stored in a list (one list per type per solid):
planar faces: nothing (there is no extra information above the edge model, see previous step)
cylindrical faces:
major axis radius
major to minor axis ratio
spherical orientation of cylinder axis taken at the closest of the face vertices projected to the cylinder axis
conical faces (excluding cylindrical faces):
squared spherical distance of cone top
angle of cone slope along major axis of its base ellipse
the major axis radius of the base ellipse
major to minor axis ratio of the base ellipse
spherical orientation of the cone axis taken at the cone top
spherical faces:
squared spherical distance of sphere center
radius of sphere toroidal faces:
    squared spherical distance of torus center,
    spherical orientation of the normal of the torus plane taken at the torus center
    (major) radius of the main circle of the torus (in the torus plane)
    (minor) radius of the cross-section of the torus ring (perpendicular to the torus plane)
nurbs faces:
    squared spherical distances of the control points For each of the type of faces, these lists of (lists of) numbers are sorted lexicographically from lowest to highest and the list for each type is compared for the two solids. The values should all be equal (or proportional based on the global scaling factor) and guarantee equal BREPs between the two solids.

Example 3: Embodiment of an Algorithm According to the Present Invention

The present example provides an embodiment of an algorithm for automatic block generation for entity sets comprising multiple 2D entities.

The algorithm works for entities for which the geometry is stored as a boundary representation (BREP). This gives direct access to the edges and vertices (and their coordinates and parameters) that constitute the boundary of the entities.

First, all 2D entities of the full drawing are organized in groups of entities with equal geometry. The algorithm works similarly as the algorithm for solids, with the difference that the checks related to faces are left out. Also, for simple 2D entities consisting of only two points, spherical distances and right-handedness checks are often trivially met.

There is no point in creating a similar automatic block creation tool for individual 2D entities, since the geometry of 2D entities is often a lot simpler and lighter (especially for LINEs) than the structure of block definitions and references. Therefore, only entity sets of multiple 2D entities are considered. The user may select such an entity set as input entity set manually.

Next, the entity in the input entity set is picked for which the equality group has lowest cardinality (in other words, the entity that has the least amount of repetition in the full drawing). A set of possible copies of the input selection is constructed by inserting each of the repetitions of this first entity in that set.

Next, the other entities in the input selection are verified and possible candidates are eliminated from the set of possible copies if they do not match. This is done as follows: after the first element, the element with the second lowest cardinality is picked. Its orientation and distance with respect to the first element is calculated. Next, for each candidate (in the set of possible copies), a duplicate of this second element at the same orientation and distance is searched. This check can be very easily performed through the lists of equal entities and spatial query indices (to quickly locate which entities are within a certain distance of a given entity, this is a standard tool available in most CAD programming environments).

This procedure is then continued until all entities in the input selection are checked. The remaining set of candidates is now the set of actual duplicates of the original input selection. Now these duplicates can be replaced via a block definition and block references, as was the case in the embodiment for single 3D solids according to example 2 above and according to the main embodiments of the invention for entities as such.

Figure 2A:
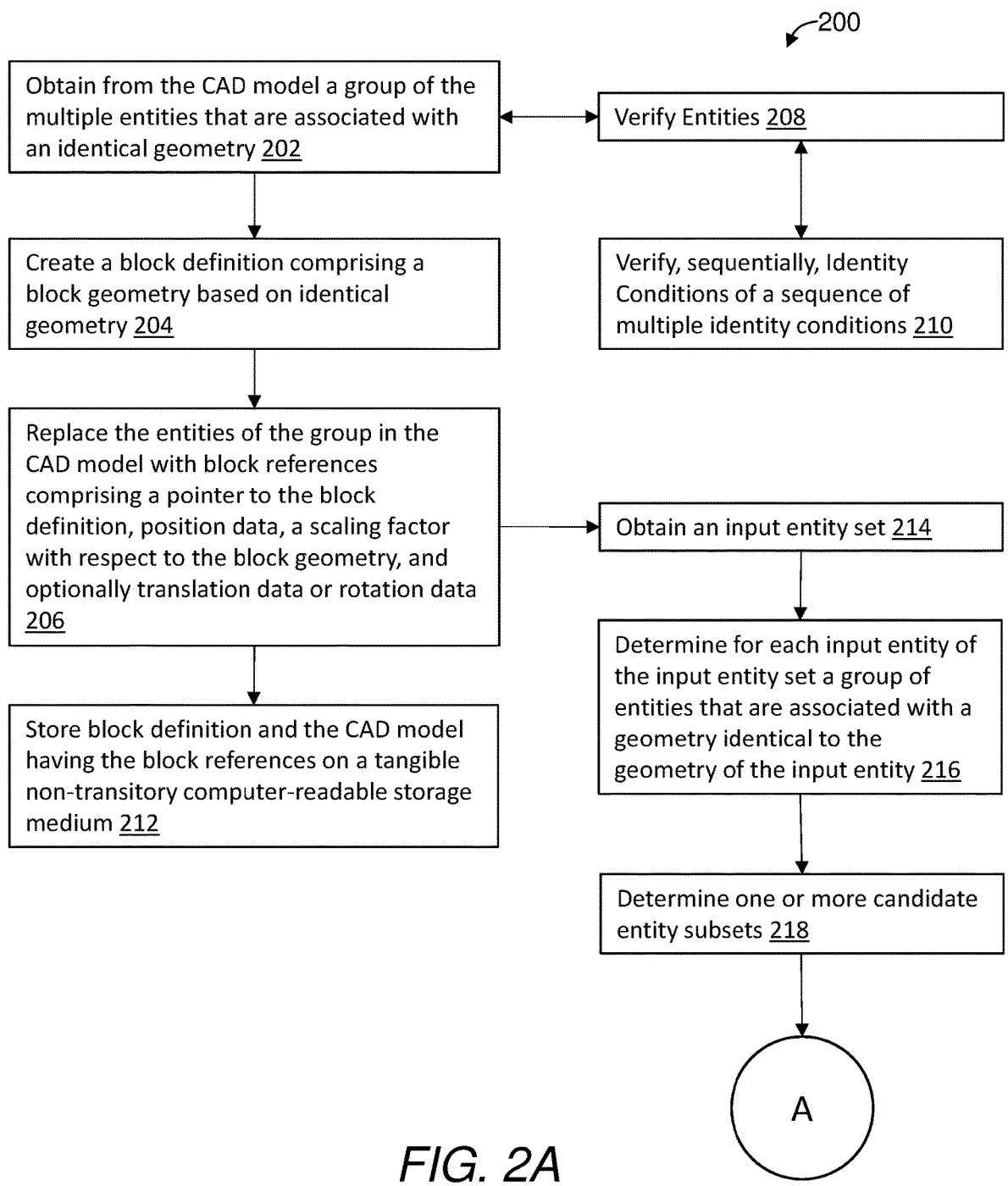
Figure 2B:
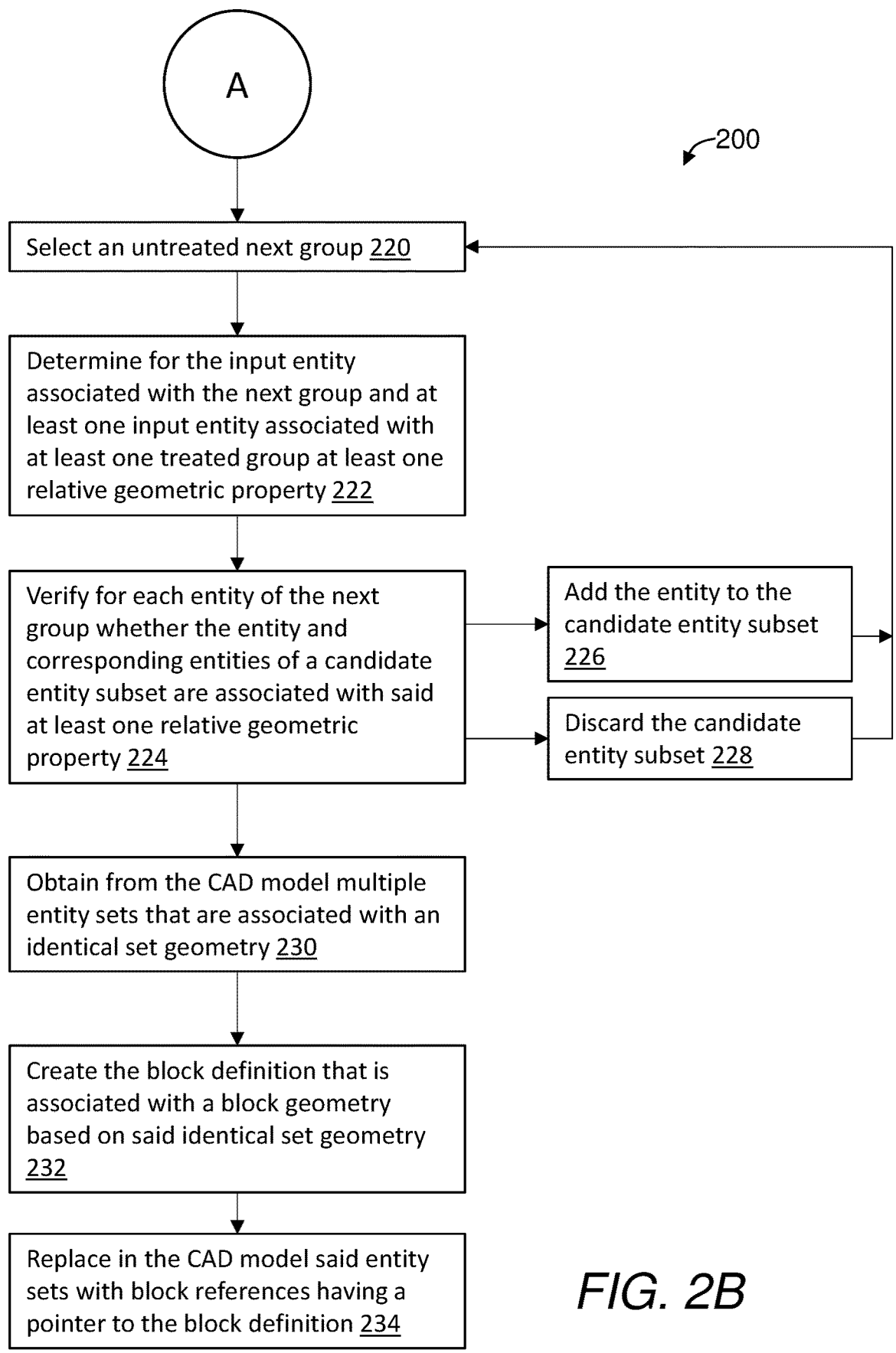

FIGS. 2A-2B illustrate a flowchart of an example method 200 for automated generation of block definition for a CAD model that includes multiple entities, according to at least one embodiment of the present disclosure. In some embodiments, each of the multiple entities may have one or more subentities, each of the subentities being a vertex, an edge or a face. The method 200 may be performed by any suitable system, apparatus, or device. For example, the method 300 may be performed using a computer system configured for automated generation of a block definition for a CAD model.

The method 200 may begin at block 202, where a group of the multiple entities that are associated with an identical geometry may be obtained from the CAD model. In some embodiments, the entities may have an identical geometry in case the subentities. In some embodiments, geometric properties of the subentiteis and relative geometric properties between the subentiteis may be either equal or proportional based on a global scaling factor. In some embodiments, an entity may include a boundary representation having one or more boundary elements, and a subentity may be a boundary element.

In some embodiments, as illustrated at block 208, obtaining the group of multiple entities from the CAD model may include verifying whether the entities of a pair of entities are associated with an identical geometry. In some embodiments, as illustrated at block 210, the verification may include sequentially verifying identity conditions of a sequence of multiple identity conditions until either an identity condition of the sequence fails or all identity conditions of the sequence are verified. In some embodiments, the sequence of multiple identity conditions may include at least three, preferably at least four, more preferably at least five, even more preferably at least six, and most preferably at least seven identity conditions.

In some embodiments, the sequence may include the following relative order: said identity condition based on equality of number of vertices; said identity condition based on equality of number of edges; said identity condition based on equality of number of faces; said identity condition based on equality or proportionality of vertex distance lists; said identity condition based on equality of the triple sum of the sign of the scalar triple product of a first, second and third vertex vector; said identity condition based on equality or proportionality of edge parameters; and said identity condition based on equality or proportionality of face parameters.

In some embodiments, each of the multiple identity condition may be based on the subentities of the pair of entities. In some embodiments, each of the multiple identity conditions may correspond to one or more of: equality of number of vertices, equality of number of edges, equality of number of faces, equality or proportionality of vertex distance lists, a vertex distance list of an entity comprising an ordered set of values, wherein each value is based on a distance of a vertex of the entity to a vertex centroid of the entity, equality of a total right-handedness TRH being a triple sum of the sign of a scale triple product of a first, second, and third vertex vector, $\vec{v}_{1,j}$, $\vec{v}_{2,k}$, $\vec{v}_{3,l}$ as follows: $TRH = \sum_{j=1}^{n_1} \sum_{k=1}^{n_2} \sum_{l=1}^{n_3} \text{sign}[(\vec{v}_{1,j} \times \vec{v}_{2,k}) \cdot \vec{v}_{3,l}]$, equality or proportionality of edge parameters, or equality or proportionality of face parameters. In some embodiments, an entity of the group of multiple entities may be a solid.

At block 204, a block definition comprising a block geometry may be created based on the identical geometry.

At block 206, the entities of the group with block references comprising a pointer to the block definition, position data, a scaling factor with respect to the block geometry, and optionally translation data and/or rotation data may be replaced in the CAD model. In some embodiments, the block reference may further include the translation data and the scaling factor with respect to the block geometry.

In some embodiments, the method 200 may further include block 212, at which the block definition and the CAD model having the block references may be stored on a tangible non-transitory computer-readable storage medium.

In some embodiments, the method 200 may include block 214, at which an input entity set including multiple input entities may be obtained. At block 216, for each input entity of the input entity set, a group of entities that are associated with a geometry identical to the geometry of the input entity may be determined, including verifying whether the entities of a pair of entities are associated with the input entity identical geometry.

At block 218, one or more candidate entity subsets may be determined, each including an entity of a first group having a minimal cardinality over all groups of entities, such as the entity that has the least amount of repetition in the full CAD model, after which said first group has been treated.

In some embodiments, blocks 220, 222, 224, 226, and 228 may be repeated iteratively until all groups have been treated. For example, at block 220, an untreated next group comprising a minimal cardinality over all untreated groups may be selected. At block 222 at least one input entity associated with at least one treated group at least one relative geometric property may be determined for the input entity associated with the next group. At block 224, it may be verified, for each entity of the next group, whether the entity and corresponding entities of a candidate entity subset are associated with said at least one relative geometric property. Depending on the verification, the entity may be added to the candidate entity subset at block 226 or discarded at block 228.

In some embodiments, the method 200 may further include block 230, at which multiple entity sets that are associated with an identical set geometry may be obtained from the CAD model. At block 232, the block definition that is associated with a block geometry may be created based on said identical set geometry. At block 234, said entity sets may be replaced in the CAD model with block references having a pointer to the block definition.

The invention claimed is:

1. A computer-implemented method for automated generation of a block definition for a CAD model that includes multiple entities, each of the multiple entities having one or more subentities, each of the subentities being a vertex, an edge or a face, the method comprising:

obtaining from the CAD model a group of the multiple entities that are associated with an identical geometry, wherein the identical geometry is when the subentities of the entities of the group, geometric properties of the subentities of the entities of the group and relative geometric properties between the subentities of the entities of the group are either equal or proportional based on a global scaling factor;

creating a block definition comprising a block geometry based on said identical geometry;

and replacing in the CAD model the entities of the group with block references comprising a pointer to the block definition, position data, a scaling factor with respect to the block geometry, and optionally translation data or rotation data, wherein:

obtaining from the CAD model the group of multiple entities includes verifying whether a pair of entities of the group are associated with the identical geometry via sequentially verifying identity conditions of a sequence of multiple identity conditions until either an identity condition of the sequence fails or all of the multiple identity conditions of the sequence are verified, and each of the multiple identity conditions is based on the subentities of the pair of entities, and wherein each of the multiple identity conditions corresponds to one of the following:

a first equality of number of vertices;

a second equality of number of edges;

a third equality of number of faces;

a fourth equality or proportionality of vertex distance lists, a vertex distance list of an entity comprising an ordered set of values, wherein each value is based on a distance of a vertex of the entity to a vertex centroid of the entity;

a fifth equality of a total right-handedness (TRH), wherein the TRH is expressed as follows:

$$TRH = \sum_{j=1}^{n_1} \sum_{k=1}^{n_2} \sum_{i=1}^{n_a} \text{sign}\left[\left(\vec{v_{1,j}} \times \vec{v_{2,k}}\right) \cdot \vec{v_{3,l}}\right].$$

wherein the $\vec{v_{1,j}}$, $\vec{v_{2,k}}$, and $\vec{v_{3,l}}$ are respectively a first vertex vector, a second vertex vector, and a third vertex vector, $n_1$, $n_2$, and $n_3$ respectively represent a number of first vertex vectors, a number of second vertex vectors, and a number of third vertex vectors, and i, j, k are integers;

a sixth equality or proportionality of edge parameters; or a seventh equality or proportionality of face parameters;

and wherein the multiple identity conditions at least comprise said fifth equality of a total right-handedness (TRH).

2. The computer-implemented method according to claim 1, further comprising storing the block definition and the CAD model having the block references on a tangible non-transitory computer-readable storage medium.

3. The computer-implemented method according to claim 1, wherein a first entity of the group of multiple entities is a solid.

4. The computer-implemented method according to claim 1, wherein:

a first entity comprises a boundary representation having one or more boundary elements, and a first subentity is a boundary element.

5. The computer-implemented method according to claim 1, wherein the sequence of the multiple identity conditions comprises at least three identity conditions.

6. The computer-implemented method according to claim 5, wherein the sequence of the multiple identity conditions comprises at least five identity conditions.

7. The computer-implemented method according to claim 2, wherein the sequence of the multiple identity conditions comprises at least six identity conditions.

8. The computer-implemented method according to claim 7, wherein the sequence of the multiple identity conditions comprises at least seven identity conditions.

9. The computer-implemented method according to claim 1, wherein the sequence of multiple identity conditions comprises the following order:

a first identity condition based on the first equality of the number of vertices;

a second identity condition based on the second equality of the number of edges;

a third identity condition based on the third equality of the number of faces;

a fourth identity condition based on the fourth equality or the proportionality of the vertex distance lists;

a fifth identity condition based on the fifth equality of the TRH;

a sixth identity condition based on the sixth equality or the proportionality of the edge parameters; and a seventh identity condition based on the seventh equality or the proportionality of the face parameters.

10. The computer-implemented method according to claim 1, further comprising:

obtaining an input entity set including multiple input entities;

determining, for each input entity of the input entity set, an input group of entities that are associated with a second geometry identical to a first geometry of the input entity, including verifying whether a second pair of entities are associated with the input entity identical geometry;

determining one or more candidate entity subsets, each including a candidate entity of a first group having a minimal amount of repetition in the CAD model over other groups of entities;

and iteratively, until all of the other groups have been treated:

selecting an untreated next group comprising a minimal amount of repetition in the CAD model over all untreated groups;

determining, for a first input entity associated with the next group and at least one input entity associated with at least one treated group, at least one relative geometric property;

and verifying, for each first entity of the next group, whether the first entity and corresponding second entities of a candidate entity subset are associated with said at least one relative geometric property, and depending on the verification, adding the first entity to the candidate entity subset or discarding the candidate entity subset, after which the next group has been treated.

11. The computer-implemented method according to claim 10, further comprising:

obtaining from the CAD model multiple entity sets that are associated with an identical set geometry;

creating a second block definition that is associated with a second block geometry based on said identical set geometry;

and replacing in the CAD model said multiple entity sets with second block references having a second pointer to the second block definition.

12. A computer system for automated generation of the block definition for said CAD model, the computer system being configured for performing the computer-implemented method according to claim 1.

13. A computer program product for automated generation of the block definition for the CAD model stored on a tangible non-transitory computer-readable storage medium, the computer program product comprising instructions which, when the computer program product is executed by a computer, cause the computer to carry out the computer-implemented method according to claim 1.

14. The computer-implemented method according to claim 1, wherein the block reference further comprises: translation data.

* * * * *